US009970389B2

(12) United States Patent
Lopez et al.

(10) Patent No.: US 9,970,389 B2
(45) Date of Patent: May 15, 2018

(54) ANTIVORTEX DEVICE AND METHOD OF ASSEMBLING THEREOF

(71) Applicant: The Boeing Company, Seal Beach, CA (US)

(72) Inventors: Alfredo Lopez, Long Beach, CA (US); Gary David Grayson, Huntington Beach, CA (US); Stephen Michael Addison, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 1064 days.

(21) Appl. No.: 14/199,093

(22) Filed: Mar. 6, 2014

(65) Prior Publication Data

US 2015/0252753 A1  Sep. 10, 2015

(51) Int. Cl.
  *F02K 9/60* (2006.01)
  *B64G 1/40* (2006.01)

(52) U.S. Cl.
  CPC ............. *F02K 9/605* (2013.01); *B64G 1/402* (2013.01); *F02K 9/60* (2013.01); *F05D 2240/12* (2013.01); *F05D 2260/602* (2013.01); *F05D 2300/514* (2013.01); *Y10T 29/49346* (2015.01); *Y10T 137/86348* (2015.04)

(58) Field of Classification Search
  CPC . B64G 1/402; F02K 9/60; F02K 9/605; F05D 2260/602; Y10T 137/85938; Y10T 137/86212; Y10T 137/86348; B64D 37/20
  See application file for complete search history.

(56) References Cited

U.S. PATENT DOCUMENTS

| | | | | |
|---|---|---|---|---|
| 2,920,648 A * | 1/1960 | Sheffer | ................... | F02K 9/605 137/582 |
| 2,946,345 A * | 7/1960 | Weltmer | ................. | F16K 17/42 137/590 |
| 4,397,408 A * | 8/1983 | Robert | ................... | B64G 1/402 222/394 |
| 4,409,098 A * | 10/1983 | Burke | ..................... | B03B 5/40 209/172.5 |
| 4,442,858 A * | 4/1984 | Everett | ................... | F04D 13/16 137/207 |
| 4,460,462 A * | 7/1984 | Arneson | ............... | E04H 4/1236 210/163 |
| 4,733,531 A * | 3/1988 | Grove | ....................... | F02K 9/44 137/154 |
| 4,768,541 A * | 9/1988 | Uney | ..................... | B64G 1/402 137/154 |
| 4,898,030 A * | 2/1990 | Yeh | ........................ | B64G 1/402 244/135 R |
| D333,342 S * | 2/1993 | Newhard | .......................... | 4/286 |
| 5,263,327 A * | 11/1993 | Drnevich | ............. | F25J 3/04303 62/646 |
| 6,113,032 A * | 9/2000 | Cochran | .................. | B64G 1/14 244/135 R |

(Continued)

*Primary Examiner* — Lorne Meade
(74) *Attorney, Agent, or Firm* — Armstrong Teasdale LLP

(57) ABSTRACT

An antivortex device for use in suppressing formation of a vortex created by fluid flowing through multiple outlet ports defined in a sump is provided. The antivortex device includes a plurality of center plates extending through a central axis of the sump, an extension plate substantially aligned with one of the plurality of center plates and extending substantially radially outward from the central axis, and a top plate coupled to the plurality of center plates.

18 Claims, 4 Drawing Sheets

(56) References Cited

U.S. PATENT DOCUMENTS

| | | | | |
|---|---|---|---|---|
| 6,220,287 B1* | 4/2001 | Wolf | ............... | B64G 1/402 |
| | | | | 137/574 |
| 6,340,035 B2* | 1/2002 | Wright | ............... | E04H 4/1236 |
| | | | | 138/96 R |
| 6,571,624 B1* | 6/2003 | Grayson | ............... | B64G 1/402 |
| | | | | 73/290 R |
| 6,591,867 B2 | 7/2003 | Grayson | | |
| 6,840,275 B2* | 1/2005 | Grayson | ............... | B64G 1/402 |
| | | | | 137/561 A |
| 7,621,291 B2* | 11/2009 | Behruzi | ............... | B64G 1/402 |
| | | | | 137/154 |
| 8,043,396 B2* | 10/2011 | Pessana | ............... | F17C 13/088 |
| | | | | 206/0.6 |
| 8,202,357 B2* | 6/2012 | Behruzi | ............... | F02K 9/605 |
| | | | | 96/204 |
| 8,439,071 B2* | 5/2013 | Ekholm | ............... | F17C 13/04 |
| | | | | 137/550 |
| 9,260,205 B2* | 2/2016 | Grayson | ............... | F02K 9/605 |
| 9,347,400 B2* | 5/2016 | Jaeger | ............... | F02K 9/42 |
| 9,395,048 B1* | 7/2016 | Grayson | ............... | B64G 1/402 |
| 9,643,741 B2* | 5/2017 | Hu | ............... | F17C 13/008 |

* cited by examiner

ANTIVORTEX DEVICE AND METHOD OF ASSEMBLING THEREOF

STATEMENT REGARDING FEDERALLY SPONSORED RESEARCH & DEVELOPMENT

This invention was made with Government support under Contract No. NNM07AB03C awarded by NASA. The Government has certain rights in this disclosure.

BACKGROUND

The field of the present disclosure relates generally to antivortex and vapor-ingestion-suppression devices and, more particularly, to antivortex and vapor-ingestion-suppression devices for liquid reservoirs including multiple liquid outlet ports.

Launch vehicles, such as rocket engine propelled vehicles intended for space travel, typically use a liquid propellant that is stored in a storage tank and supplied to engines during takeoff and flight. When the liquid propellant is supplied to the engines, vapor or gases cannot be allowed to enter the engines in large amounts. If vapor or gas is introduced into the engines in sufficient quantities, the vapor ingestion may cause a stall or other malfunctions that may increase the possibility of engine failure. Additionally, it may be desirable to empty the liquid storage tanks as completely as possible through engine combustion to maximize engine operating time, which may allow for increased vehicle payload.

One known attempt to reduce vapor ingestion uses a screen that encompasses substantially all or at least a portion of the interior area of the liquid storage tank. In this system, fluid is wicked through the screens by capillary action, and vapor or gas bubbles are prevented from flowing through the screens due to the bubble point pressure of the fluid screen system. However, such screen systems are typically only for storage tanks being used in low gravity and are less useful in higher gravity environments. Additionally, the screen systems typically cannot be used with some liquid propellants such as hydrogen peroxide ($H_2O_2$) due to material incompatibility between $H_2O_2$ and typical screen materials.

Other known systems are antivortex devices positioned in the storage tanks that include vanes extending a distance from a sump of the tank towards the walls of the storage tank. These vanes help bring liquid propellants to the outflow area of the storage tank through capillary action, and may reduce the ingestion of gas bubbles into the engine of the vehicle. However, antivortex devices used in known vapor-ingestion-suppression systems generally are designed for low gravity applications and cannot provide substantial vapor ingestion suppression at the higher gravity conditions typical of launch vehicles, and/or are designed to be used in storage tanks without a recessed multi-outlet sump. Moreover, increased vortex suppression may be needed as a fuel discharge rate from the storage tanks increases resulting from the storage tanks incorporating an increasing number of fuel outlets.

BRIEF DESCRIPTION

In one aspect, an antivortex device for use in suppressing formation of a vortex created by fluid flowing through multiple outlet ports defined in a sump is provided. The antivortex device includes a plurality of center plates extending through a central axis of the sump, an extension plate substantially aligned with one of the plurality of center plates and extending substantially radially outward from the central axis, and a top plate coupled to the plurality of center plates.

In another aspect, a liquid reservoir is provided. The liquid reservoir includes a bottom portion, a sump selectively coupled to the bottom portion and including multiple outlet ports in fluid communication with a fluid conduit, and an antivortex device. The antivortex device includes a plurality of center plates extending through a central axis of the sump, an extension plate substantially aligned with one of the plurality of center plates and extending substantially radially outward from the central axis, and a top plate coupled to the plurality of center plates.

In yet another aspect, a method of assembling an antivortex device for use in a liquid reservoir is provided. The method includes coupling a first sub-assembly to a sump of the liquid reservoir, coupling a second sub-assembly to a bottom portion of the liquid reservoir. The first sub-assembly includes a plurality of center plates extending through a central axis of the sump, and the second sub-assembly includes an extension plate. The method also includes coupling the sump to the bottom portion such that the extension plate is substantially aligned with one of the plurality of center plates and extends substantially radially outward from the central axis.

DETAILED DESCRIPTION

The implementations described herein relate to an antivortex device for use in suppressing formation of a vortex created by fluid being discharged from a liquid reservoir. More specifically, the antivortex device is designed to be incorporated with a recessed multi-outlet sump extending below a bottom portion of the liquid reservoir. In the exemplary implementation, the antivortex device includes a plurality of center plates, a top plate coupled to the center plates, and a plurality of extension plates extending from distal ends of each center plate. At least a portion of the center plates are sized for insertion into the recessed sump such that the antivortex device is substantially stabilized within the liquid reservoir, and the extension plates facilitate increasing the vortex suppression capability of the antivortex device. Moreover, because the size of the antivortex device described herein has been increased to facilitate vortex suppression within liquid flowing at increased discharge rates, components of the antivortex device are able to be assembled and installed within the liquid reservoir separately to simplify installation of the antivortex device.

Figure 1:
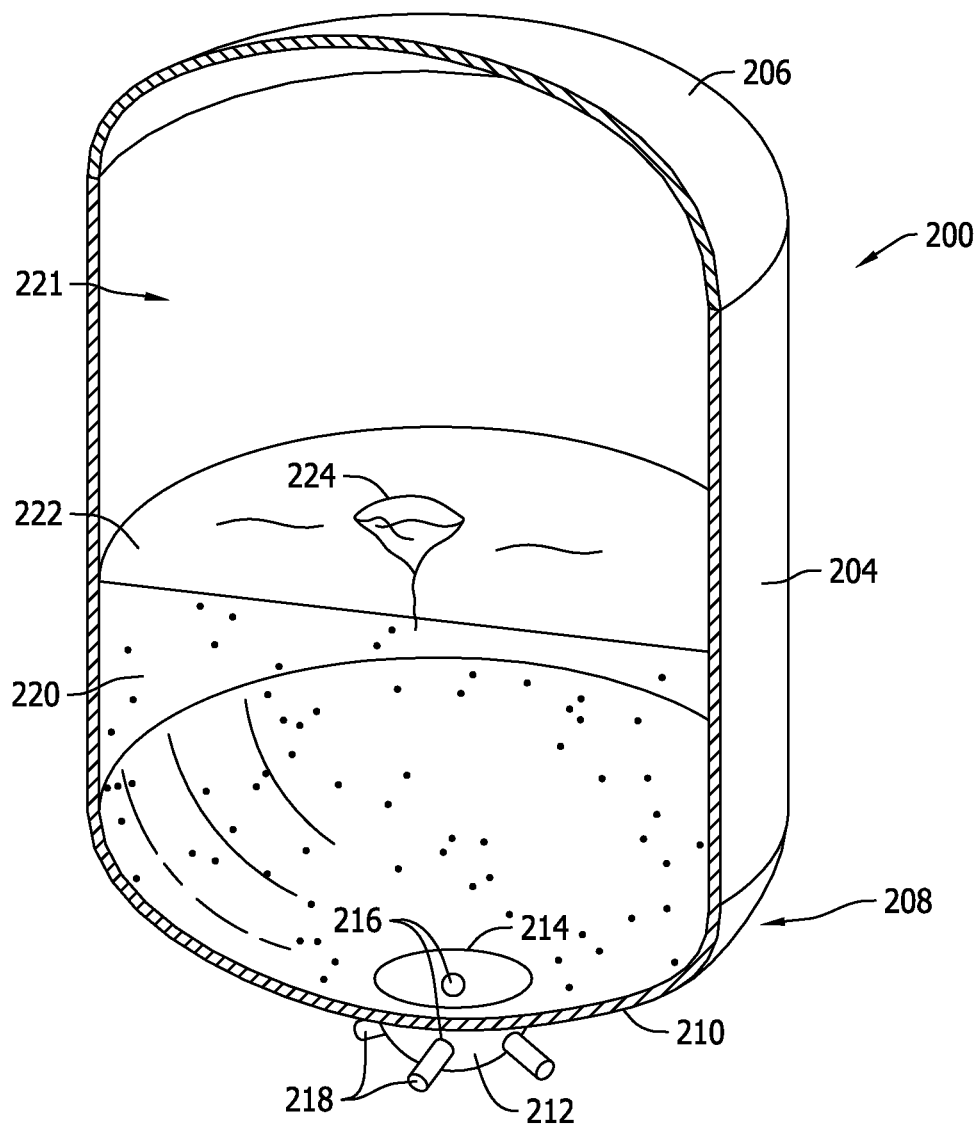
FIG. 1 is a cross-sectional illustration of an exemplary liquid reservoir.
Figure 2:
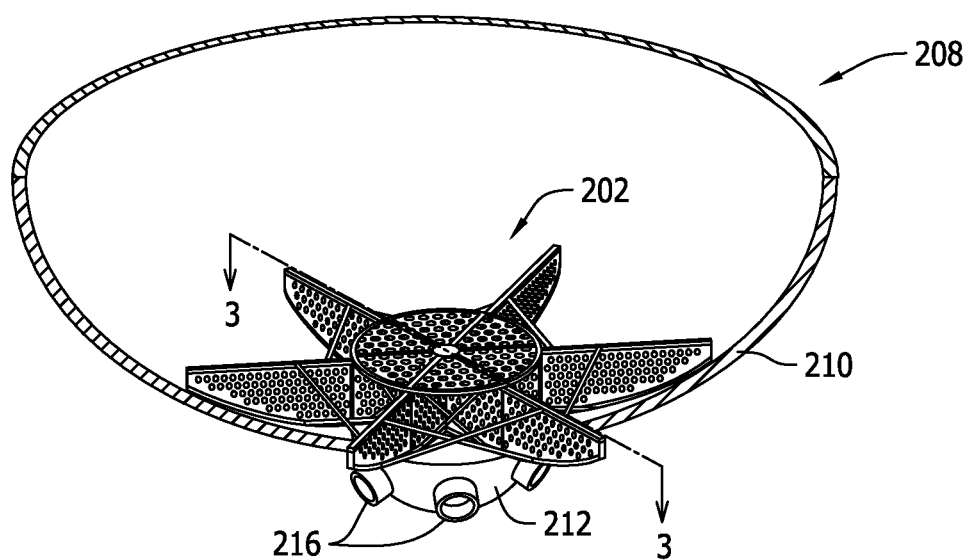
FIG. 2 is a perspective view of an exemplary antivortex device in the liquid reservoir shown in FIG. 1.

FIG. 1 is a cross-sectional illustration of an exemplary liquid reservoir 200, and FIG. 2 is a perspective view of an exemplary antivortex device 202 in liquid reservoir 200. In the exemplary implementation, liquid reservoir 200 includes a side wall 204, a top dome 206, and a bottom portion 208 defined by a sump plate 210. Specifically, sump plate 210 includes a sump 212 coupled to bottom portion 208 at a sump aperture 214. Sump 212 extends below bottom portion 208 and has a semi-hemispherical shape. Moreover, sump 212 is selectively removable from bottom portion 208 and has a plurality of outlet ports 216 defined therein. Outlet ports 216 are in fluid communication with a plurality of fluid conduits 218. In some implementations, fluid conduits 218 supply liquid to an engine of a launch vehicle (not shown).

In the exemplary implementation, side wall 204 of liquid reservoir 200 has a generally cylindrical shape and contains a liquid 220 such as a liquid propellant therein. Exemplary liquid propellants include, but are not limited to, liquid oxygen ($LO_2$), liquid hydrogen ($LH_2$), hydrogen peroxide ($H_2O_2$), kerosene, gasoline, and hydrocarbon fuels. In some implementations, reservoir 200 is internally pressurized relative to an ambient environment (not shown) that facilitates ensuring liquid 220 is discharged from reservoir 200 through outlet ports 216. A liquid/gas interface 222 divides liquid 220 in liquid reservoir 200 from ullage gas 221 located above liquid 220. As liquid 220 is discharged through outlet ports 216, liquid/gas interface 222 moves downward within liquid reservoir 200 and a surface dip 224 (i.e., a vortex) is formed in liquid/gas interface 222. Surface dip 224 is formed as a function of a discharge rate of liquid 220 through outlet ports 216, motion of a vehicle containing liquid reservoir 200, asymmetric features (not shown) of liquid reservoir 200, and/or the fluid type contained within liquid reservoir 200. As liquid/gas interface 222 reaches bottom portion 208 of liquid reservoir 200, the formation of surface dip 224 may result in vapor being discharged through outlet ports 216.

In the exemplary implementation, antivortex device 202 is positioned in bottom portion 208 of liquid reservoir 200 to facilitate suppressing formation of surface dip 224 in liquid 220. For example, antivortex device 202 facilitates decreasing the kinetic energy of a swirling flow of liquid 220 in liquid reservoir 200 to suppress formation of surface dip 224. As will be described in more detail below, antivortex device 202 is designed such that liquid 220 is forced to flow through and/or around antivortex device 202, which facilitates decreasing the size of surface dip 224 and reduces the possibility of vapor ingestion into outlet ports 216. Moreover, antivortex device 202 may be used in a liquid reservoir for use in a variety of applications such as, but not limited to, space vehicles (i.e., rockets, satellites, interplanetary aircraft, and interstellar aircraft), aircraft (i.e., airplanes, unmanned aerial vehicles, and helicopters), land transportation (i.e., automobiles), and/or ground plants (i.e., chemical processing, propellant products, and wastewater treatment).

Figure 3:
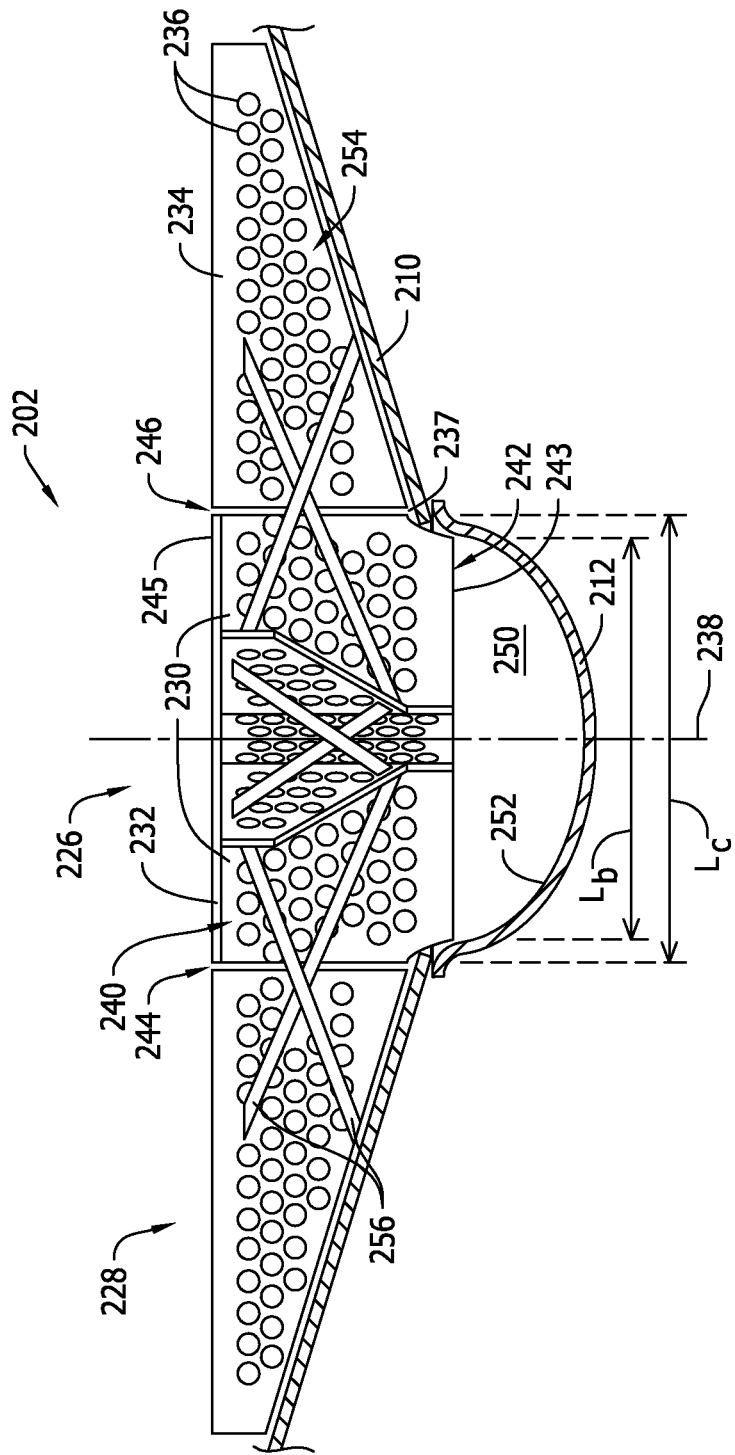
FIG. 3 is a side view of the antivortex device shown in FIG. 2 and taken along Line 3.
Figure 4:
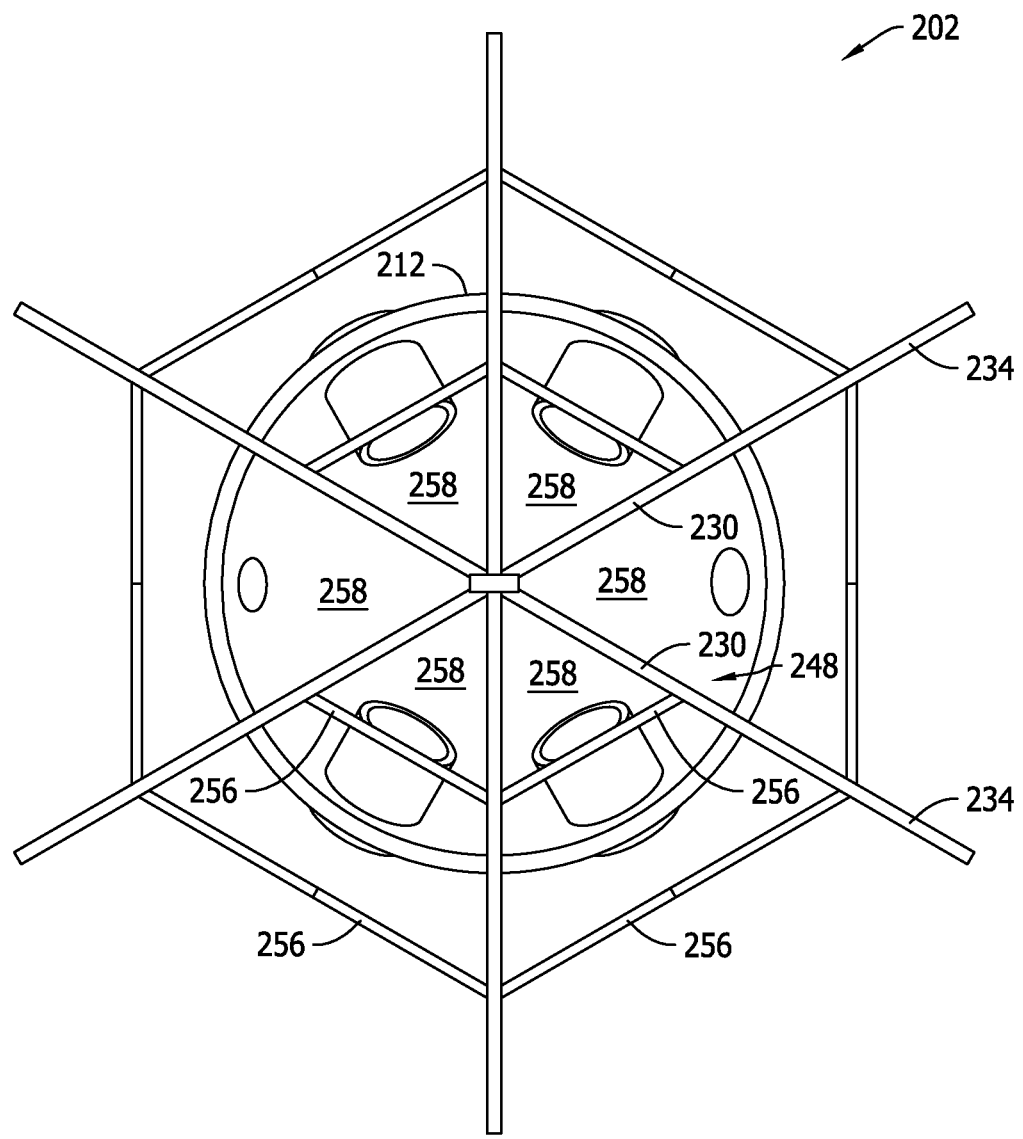
FIG. 4 is a partially transparent top view of the antivortex device shown in FIG. 2.

FIG. 3 is a side view of antivortex device 202 taken along line 3 (shown in FIG. 2), and FIG. 4 is a partially transparent top view of antivortex device 202. In the exemplary implementation, antivortex device 202 includes a first sub-assembly 226 coupled to sump 212, and a second sub-assembly 228 coupled to bottom portion 208 of liquid reservoir 200. First sub-assembly 226 includes a plurality of center plates 230 and a top plate 232, and second sub-assembly 228 includes a plurality of extension plates 234. In some implementations, one or more of the components of antivortex device 202 may be formed as a single piece, multiple pieces, integrally formed together, and/or formed via an additive manufacturing technique. For example, each of center plates 230, top plate 232, and extension plates 234 may be formed as a single piece or multiple pieces, or antivortex device 202 may be formed as a unitary structure. In the exemplary implementation, extension plates 234 are removably coupled to respective center plates 230. Moreover, although shown as including three center plates 230 and six extension plates 234, first and second sub-assemblies 226 and 228 may include any number of center plates 230 and extension plates 234 that enables antivortex device 202 to function as described herein. For example, the number of center plates 230 and extension plates 234 may be increased to increase the vortex suppression capability of antivortex device 202.

In some implementations, one or more of center plates 230, top plate 232, and extension plates 234 include a plurality of perforations 236 formed therein. Perforations 236 may be formed by any suitable process such as, but not limited to, drilling, punching, cutting, casting, and molding. One or more of center plates 230, top plate 232, and extension plates 234 may be perforated to an extent that the porosity of the respective plate is between about 20% to about 40% porous. Such perforations facilitate frictional energy dissipation of vortex flows thereby reducing the size of surface dip 224 and the associated residual liquid in the reservoir 200 when gas is first ingested into the outlet ports 216. Although perforations 236 are shown to have a circular shape, perforations 236 may have any shape that enables antivortex device 202 to function as described herein.

In the exemplary implementation, center plates 230 are coupled to and extend through a central axis 238 of sump 212. More specifically, center plates 230 are oriented to be substantially perpendicular to a direction of liquid 220 swirling in liquid reservoir 200 (both shown in FIGS. 1 and 2). As such, the kinetic energy of liquid 220 flowing past center plates 230 is disrupted to facilitate decreasing the likelihood of surface dip 224 formation in liquid 220. Moreover, each center plate 230 includes a top portion 240, a bottom portion 242, a first end 244, and a second end 246. At least a portion of center plates 230 are sized for insertion into sump 212. Specifically, a length $L_b$ of bottom portion 242 is less than a length $L_c$ of each center plate 230 such that bottom portion 242 is sized for insertion through an opening 248 in sump 212, extending below a bottom edge 237 of extension plates 234, and into a recessed region 250 in sump 212. Bottom portion 242 is then coupled to an inner surface 252 of sump 212. Moreover, as will be described in more detail below, length $L_c$ of center plates 230 is less than a diameter (not shown) of sump 212 to facilitate assembly of antivortex device 202 in liquid reservoir 200.

First sub-assembly 226 also includes top plate 232 coupled to center plates 230. In the exemplary implementation, top plate 232 is coupled to respective top portions 240 of each center plate 230 and has a substantially circular shape. Top plate 232 extends between first and second ends 244 and 246 of each center plate 230 and has a substantially planar profile. As liquid 220 in liquid reservoir 200 is drained, the interaction of top plate 232 with liquid/gas interface 222 facilitates decreasing the likelihood of surface dip 224 formation in liquid 220.

In some implementations, antivortex device 202 has any height H that enables antivortex device 202 to function as described herein. Height H is defined as the distance between a bottom edge 243 of bottom portion 242 and a top surface 245 of top plate 232. Height H is a characteristic liquid level height at which vapor ingestion into outlet ports 216 becomes a risk. Height H is selected as a function of the flow rate, acceleration, and fluid type represented in a non-dimensional ratio of the inertia-to-buoyancy forces near outlet ports 216. This force ratio is often called the Froude number and is defined as velocity-squared divided by both acceleration and characteristic length. For example, as the flow velocity of liquid 220 increases, height H is increased to facilitate decreasing the likelihood of surface dip 224 formation. Similarly, as acceleration and characteristic lengths increase, a lower height H may be implemented to facilitate decreasing the likelihood of surface dip 224 formation.

In the exemplary implementation, second sub-assembly 228 includes extension plates 234 positioned circumferentially about first sub-assembly 226 and/or sump 212. Extension plates 234 have a substantially planar profile and extend substantially radially outward relative to central axis 238 of sump 212. More specifically, pairs of extension plates 234 are substantially aligned with each center plate 230 such that extension plates 234 extend from respective ends 244 and 246 of each center plate 230. In some implementations, extension plates 234 are selectively coupled to center plates 230 when substantially aligned therewith. As such, extension plates 234 facilitate increasing the vortex suppression capability of antivortex device 202. Moreover, a bottom portion 254 of each extension plate 234 has a contour that substantially matches a contour of bottom portion 208 of liquid reservoir 200.

Antivortex device 202 also includes at least one stringer 256 coupled between adjacent center plates 230 and/or extension plates 234 to increase the rigidity of antivortex device 202. In the exemplary implementation, stringers 256 are oriented in a cross, or "X" pattern, and extend obliquely between adjacent center plates 230 and/or extension plates 234. However, stringers 256 may extend in any configuration, and in any number, that increases the rigidity of the antivortex device 202.

In some implementations, the antivortex device 202 has slosh suppression capabilities. For example, each of center plates 230, top plate 232, and extension plates 234 may be configured to suppress or dampen lateral and transversely moving flows of liquid 220 within reservoir 200. Without being bound to a particular theory, as the moving flow interacts with one or more of center plates 230, top plate 232, and extension plates 234, the friction caused by such interaction facilitates reducing the flow energy of the moving flow.

Referring to FIG. 4, in the exemplary implementation, center plates 230 intersect with each other at about central axis 238 of sump 212. The orientation of center plates 230 facilitates creating flow paths 258 for liquid 220 (shown in FIG. 1) to flow towards outlet ports 216. Flow paths 258 are defined between adjacent center plates 230, and are defined as a function of the number of center plates 230 included in first sub-assembly 226. More specifically, the number and orientation of flow paths 258 are selected based on the number and orientation of outlet ports 216 in sump 212. For example, as the number of outlet ports 216 in sump 212 increases, additional center plates 230 are included in first sub-assembly 226 to enable additional flow paths 258 to be defined therein. In one implementation, center plates 230 are oriented such that a flow path 258 is substantially aligned with one of outlet ports 216. Alternatively, center plates 230 are oriented such that a center plate 230 is substantially aligned with one of outlet ports 216. In such an implementation, bottom portion 242 of each center plate 230 is unperforated such that center plate 230 functions as a flow straightener for liquid 220 flowing into outlet ports 216.

A method of assembling antivortex device 202 is also described herein. The method includes coupling first sub-assembly 226 to sump 212, coupling second sub-assembly 228 to bottom portion 208 of liquid reservoir 200, and coupling sump 212 to bottom portion 208. More specifically, first sub-assembly 226 is sized for insertion through sump aperture 214 (shown in FIG. 1) such that first sub-assembly 226 extends through sump aperture 214 when sump 212 is selectively coupled to bottom portion 208. Sump 212 is then oriented such that extension plates 234 of second sub-assembly 228 are substantially aligned with center plates 230 of first sub-assembly 226. As such, first and second sub-assemblies 226 and 228 are assembled separately from each other and then installed within liquid reservoir 200 to form antivortex device 202.

The implementations described herein relate to antivortex devices for use in liquid reservoirs, such as liquid propellant tanks. As fluid is discharged from the liquid reservoir, fluid flow within the liquid reservoir is altered advantageously by the antivortex device to facilitate restricting vapor discharge through outlet ports in a sump. The antivortex device is formed from a first sub-assembly including center plates and a top plate, and a second sub-assembly including extension plates. The first sub-assembly is coupled to a sump, and the sump is selectively coupled to a bottom portion of the liquid reservoir. Specifically, the first sub-assembly is sized for insertion through a sump aperture defined in the bottom portion of the liquid reservoir such that the first sub-assembly enters the liquid reservoir when the sump is coupled to the bottom portion. As the first sub-assembly is raised into position within the liquid reservoir, the first sub-assembly is oriented into alignment with the second sub-assembly that is coupled to the bottom portion of the liquid reservoir. As such, the implementations described herein provide antivortex devices having improved vortex suppression capabilities, and provide simplified assembly of the antivortex devices.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An antivortex device for use in suppressing formation of a vortex created by fluid flowing through multiple outlet ports defined in a sump, said antivortex device comprising:
    a plurality of center plates coupled to and extending radially through a central axis of the sump, each center plate of the plurality of center plates having a bottom edge contained in a first plane perpendicular to said central axis;
    a top plate coupled to said plurality of center plates, said top plate having a top surface in a second plane perpendicular to said central axis, the antivortex device having a height defined as a distance between the first plane and the second plane along said central axis; and
    a plurality of extension plates, wherein each one of said plurality of extension plates is substantially aligned with a respective center plate of said plurality of center plates, said plurality of extension plates extending substantially radially outward from said plurality of center plates such that a distal end of each one of said plurality of extension plates is located within said height.

2. The device in accordance with claim 1, wherein said plurality of center plates are oriented such that at least one of the multiple outlet ports are substantially aligned with a flow path defined between adjacent center plates.

3. The device in accordance with claim 1, wherein said plurality of extension plates are removably coupled to respective center plates of said plurality of center plates.

4. The device in accordance with claim 1, wherein at least a portion of said plurality of center plates are sized for insertion into the sump.

5. The device in accordance with claim 1, wherein said plurality of center plates, said extension plate, and said top plate comprise a plurality of perforations such that each of said plurality of center plates, said extension plate, and said top plate have a porosity between about 20% and about 40%.

6. The device in accordance with claim 1 further comprising at least one stringer coupled between two plates including at least two of said plurality of center plates or at least two of said plurality of extension plates, said at least one stringer configured to increase the rigidity of the antivortex device.

7. The device in accordance with claim 1, wherein said plurality of extensions plates each comprise a top edge that is substantially coplanarly aligned with said top plate.

8. A liquid reservoir comprising:
a bottom portion;
a sump selectively coupled to said bottom portion and comprising multiple outlet ports; and
an antivortex device comprising:
  a first sub-assembly comprising:
    a plurality of center plates coupled to said sump, said plurality of center plates coupled to and extending radially through a central axis of said sump, each center plate of the plurality of center plates having a bottom edge contained in a first plane perpendicular to said central axis; and
    a top plate coupled to said plurality of center plates, said top plate having a top surface in a second plane perpendicular to said central axis, the antivortex device having a height defined as a distance between the first plane and the second plane along said central axis;
  a second sub-assembly coupled to said bottom portion and comprising:
    a plurality of extension plates, wherein each one of said plurality of extension plates is substantially aligned with a respective center plate of said plurality of center plates, said plurality of extension plates extending substantially radially outward from said plurality of center plates such that a distal end of each one of said plurality of extension plates is located within said height; and
  at least one stringer coupled between two plates, the at least two plates including at least two of said plurality of center plates or at least two of said plurality of extension plates.

9. The liquid reservoir in accordance with claim 8, wherein the liquid reservoir is a tank for storing liquid propellant for a rocket.

10. The liquid reservoir in accordance with claim 8, wherein said first sub-assembly is sized for insertion through a sump aperture defined in said bottom portion.

11. The liquid reservoir in accordance with claim 8, wherein said sump comprises a recessed region configured to receive at least a portion of said plurality of center plates.

12. The liquid reservoir in accordance with claim 11, wherein said at least a portion of said plurality of center plates extend below a bottom edge of each one of said plurality of extension plates.

13. The liquid reservoir in accordance with claim 8, wherein said plurality of center plates and said plurality of extension plates comprise a plurality of perforations such that each of said plurality of center plates and said plurality of extension plates have a porosity between about 20% and about 40%.

14. The liquid reservoir in accordance with claim 8, wherein said plurality of extensions plates each comprise a top edge that is substantially coplanarly aligned with said top plate.

15. A method of assembling an antivortex device for use in a liquid reservoir, said method comprising:
coupling a first sub-assembly to a sump detached from the liquid reservoir, wherein the first sub-assembly includes:
  a plurality of center plates coupled to and extending radially through a central axis of the sump, each center plate of the plurality of center plates having a bottom edge contained in a first plane perpendicular to said central axis; and
  a top plate coupled to said plurality of center plates, said top plate having a top surface in a second plane perpendicular to said central axis, the first sub-assembly having a height defined as a distance between the first plane and the second plane along said central axis; and
coupling a second sub-assembly to a bottom portion of the liquid reservoir through a sump aperture defined in the bottom portion, wherein the second sub-assembly includes a plurality of extension plates coupled inside said liquid reservoir;
coupling at least one stringer between two plates, the at least two plates including at least two of said plurality of center plates or at least two of said plurality of extension relates to increase rigidity of the antivortex device; and
coupling the sump to the bottom portion by inserting the first sub-assembly into first sub-assembly such that each one of said plurality of extension plates is substantially aligned with a respective one of the plurality of center plates and extends substantially radially outward from the central axis such that a distal end of each one of said plurality of extension plates is located within said height.

16. The method in accordance with claim 15, wherein coupling the sump to the bottom portion comprises sizing the first sub-assembly for insertion through the sump aperture defined in the bottom portion of the liquid reservoir.

17. The method in accordance with claim 15 further comprising defining a plurality of perforations in the plurality of center plates and the plurality of extension plates such that each of the plurality of center plates and the plurality of extension plates have a porosity between about 20% and about 40%.

18. The method in accordance with claim 15, wherein coupling a second sub-assembly to the bottom portion comprises forming a bottom portion of each one of the plurality of extension plates to substantially correspond to a contour of the bottom portion of the liquid reservoir.

* * * * *

UNITED STATES PATENT AND TRADEMARK OFFICE
CERTIFICATE OF CORRECTION

PATENT NO.         : 9,970,389 B2                              Page 1 of 1
APPLICATION NO.    : 14/199093
DATED              : May 15, 2018
INVENTOR(S)        : Lopez et al.

It is certified that error appears in the above-identified patent and that said Letters Patent is hereby corrected as shown below:

In the Claims

In Column 8, Line 37, Claim 15, delete "relates" and insert therefor -- plates --.

In Column 8, Line 40, Claim 15, between "into" and "first", insert -- the liquid reservoir through the sump aperture and orientating the sump coupled to the --.

Signed and Sealed this
Tenth Day of July, 2018

Andrei Iancu
*Director of the United States Patent and Trademark Office*